US007000861B2

(12) United States Patent
Fujii et al.

(10) Patent No.: US 7,000,861 B2
(45) Date of Patent: Feb. 21, 2006

(54) MAGNETIC TAPE CARTRIDGE

(75) Inventors: Akihiko Fujii, Odawara (JP); Seiji Tsuyuki, Odawara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 141 days.

(21) Appl. No.: 10/640,317

(22) Filed: Aug. 14, 2003

(65) Prior Publication Data

US 2004/0035735 A1    Feb. 26, 2004

(30) Foreign Application Priority Data

Aug. 23, 2002  (JP)  ............................. 2002-243591

(51) Int. Cl.
*G11B 23/107* (2006.01)
(52) U.S. Cl. ...................... 242/348; 360/132; 156/73.1; 156/273.3
(58) Field of Classification Search ................ 242/348, 242/348.2; 360/132; 156/73.1, 273.3
See application file for complete search history.

(56) References Cited

FOREIGN PATENT DOCUMENTS

| JP | 11-306722 | 11/1999 |
|---|---|---|
| JP | 2001-148179 | 5/2001 |
| JP | 2001-266533 | 9/2001 |

*Primary Examiner*—John Q. Nguyen
(74) *Attorney, Agent, or Firm*—Sughrue Mion, PLLC

(57) ABSTRACT

A magnetic tape cartridge made up of a cartridge case composed of an upper and lower cases welded together on the mating surfaces by ultrasonic welding with a plurality of energy directors, and a single reel of magnetic tape rotatalby retained in the case, in which the weld deposits formed by the energy directors may be prevented from sticking out of the mating surfaces. A plurality of energy directors provided on one of the mating surfaces have an elongated shape, and are disposed with the longitudinal direction substantially perpendicular to the direction along the side wall of the upper and lower cases.

3 Claims, 3 Drawing Sheets

MAGNETIC TAPE CARTRIDGE

BACKGROUND OF THE INVENTION

1. Field of the Invention

The present invention relates to a magnetic tape cartridge having a single reel of magnetic tape rotatably retained therein.

2. Description of the Related Art

Conventionally, the magnetic tape cartridge having a single reel of magnetic tape rotatably retained therein has been known as a type of magnetic tape cartridge used as the recording medium of an external storage device of computers, etc. as described, for example, in Japanese Unexamined Patent Publication Nos. 11(1999) -306722, 2001-148179, and 2001-266533.

FIG. 4 is a perspective view of a magnetic tape cartridge 1 of this type, illustrating an overall structure of the cartridge with a sliding door 11 opened. On a side wall of a cartridge case 4 composed of an upper case 2 and a lower case 3 firmly fixed together as a unit, a tape reeling-out opening 10 that extends to the upper and lower cases 2 and 3 is formed in the vicinity of a corner section. The tape reeling-out opening 10 has a sliding door 11 which is slidable to open and close the opening 10. A magnetic tape 6 is used as a data storage medium of computers and the like, and has a leader pin 5 firmly fixed at the end, which is engaged by a pin holding member of a magnetic tape cartridge read/write apparatus for reeling out the magnetic tape 6 from the cartridge case 4, and loading onto the magnetic tape cartridge read/write apparatus when the magnetic tape cartridge 1 is loaded therein. The magnetic tape cartridge read/write apparatus is configured and adapted to rewind the magnetic tape onto the reel 7 and bring back the leader pin into the cartridge when the magnetic tape cartridge is unloaded.

The cartridge case 4 is composed of the upper case 2 and lower case 3 made of a synthetic resin firmly fixed together as a unit, e.g. by screws as described, for example, in Japanese Unexamined Patent Publication No. 2001-148179, or by ultrasonic welding on the mating surfaces of the side walls of the upper and lower cases 2 and 3 as described, for example, in Japanese Unexamined Patent Publication No. 2001-266533. The leader pin 5 is removably retained across the upper and lower cases with the axis line in up-down direction in the vicinity of the tape reeling-out opening 10 provided on the cartridge case 4, and the sliding door 11 for opening and closing the tape reeling-out opening 10 is urged by a spring toward a position to close the opening 10.

In the magnetic tape cartridge 1 structured as described above, the tape reeling-out opening 10 is formed in the vicinity of a corner of the generally square cartridge case 4, and a space for the pathway of the magnetic tape and the access path to the leader pin 5 by the pin holding member of the magnetic tape read/write apparatus needs to be secured around the place where the leader pin 5 is retained inside the opening 10, so that the screws for fixing the upper and lower cases can not be used in that area, and consequently they are provided in places away from that area as described, for example, in Japanese Unexamined Patent Publication No. 2001-148179. Therefore, the area of the cartridge case 4 in the vicinity of the tape reeling-out opening 10 has a low strength, since the area has no fixed portion secured by screws, as well as no side wall because of the opening 10, and moreover, a lead-in recess 20 for the leader pin 5 is formed on the bottom surface of the lower case 3.

In handling the magnetic tape cartridge 1, the cartridge may be sometimes dropped accidentally on the floor, and if it falls with the corner having the tape reeling-out opening 10 facing downwards, crashing the weak corner in bond strength against the floor, the case 4 is likely to be damaged with the broken or cracked corner.

In this connection, it may be contemplated that the upper and lower cases are welded together as described, for example, in Japanese Unexamined Patent Publication No. 2001-266533, in order to increase the bond strength. But a portion of a weld deposit jointing the mating surfaces of the upper and lower cases may stick out of the mating surfaces, thereby cosmetic appearance is spoiled. In addition, the portion of the weld deposit sticking out of the mating surfaces may come off by frictions and contaminates the working environment. Further, a portion of the weld deposit may get into the case by the vibration of the ultrasonic horn during the welding process, and turns into so-called welding dust which causes degradation in the quality of the magnetic tape cartridge.

SUMMARY OF THE INVENTION

In recognition of the circumstance described above, it is an object of the present invention to provide a magnetic tape cartridge capable of preventing a weld deposit from sticking out.

The magnetic tape cartridge according to the present invention comprises: a cartridge case composed of an upper and lower cases welded together on the mating surfaces thereof by ultrasonic welding with a plurality of energy directors, and having a tape reeling-out opening on a side wall thereof; and a single reel of magnetic tape rotatably retained therein, wherein each of said plurality of energy directors provided on one of said mating surfaces has an elongated shape, and is disposed with the longitudinal direction thereof substantially perpendicular to the direction along the side wall of the upper and lower cases.

It is preferable, however, that the energy director provided on one of the mating surfaces near the end of the side wall of the upper and lower cases is extended, to the area in close proximity to the end of the side wall, in the direction parallel to the direction along the side wall.

Further, the magnetic tape cartridge according to the present invention comprises: a cartridge case composed of an upper and lower cases welded together on the mating surfaces thereof by ultrasonic welding with a plurality of energy directors, and having a tape reeling-out opening on a side wall thereof; and a single reel of magnetic tape rotatably retained therein, wherein one of said mating surfaces on which said plurality of energy directors are provided has grooves on both sides of said plurality of energy directors for trapping the weld deposits made of said plurality of energy directors.

Preferably, the grooves on one of the mating surfaces for trapping the weld deposits is created to enclose the plurality of energy directors.

Still further, the magnetic tape cartridge according to the present invention comprises: a cartridge case composed of an upper and lower cases welded together on the mating surfaces thereof by ultrasonic welding with a plurality of energy directors, and having a tape reeling-out opening on a side wall thereof; and a single reel of magnetic tape rotatably retained therein, wherein said plurality of energy directors provided on one of said mating surfaces are disposed off-center on the inner side of the case with respect to the center of said one of the mating surfaces in the direction of the thickness thereof, and said one of the mating surfaces has a wall on the inner side of the case with respect to said plurality of energy directors for blocking the weld deposits made of said plurality of energy directors from flowing out of said mating surfaces.

If the energy director has an elongated rib-like shape, the weld deposit formed thereby has a tendency to extend in the direction perpendicular to the longitudinal direction thereof.

In a magnetic tape cartridge according to the present invention, a plurality of elongated energy directors are disposed with the longitudinal direction substantially perpendicular to the direction along the side wall of the upper and lower cases, so that the weld deposits flow on the mating surface along the direction parallel to the direction along the side wall of the upper and lower cases, thereby the weld deposits may be prevented from sticking out of the mating surfaces. In this case, the energy director near the end of the side wall of the upper and lower cases is extended to an area in close proximity to the end of the side wall in the direction parallel to the direction along the side wall, thereby the upper and lower cases may be welded together to the area in close proximity to the end of the side wall, while the weld deposits are prevented from sticking out of the mating surfaces at the end of the side wall.

Further, in the magnetic tape cartridge according to the present invention, one of the mating surfaces on which the plurality of energy directors are provided has grooves on both sides of the plurality of energy directors for trapping the weld deposits made of the plurality of energy directors, so that the weld deposits may be prevented from sticking out of the mating surfaces, regardless of the direction in which the plurality of energy directors is extended.

Still further, in the magnetic tape cartridge according to the present invention, a plurality of energy directors provided on one of the mating surfaces are disposed off-center on the inner side of the case with respect to the center of the mating surface in the direction of the thickness thereof, and the mating surface has a wall on the inner side of the case with respect to the plurality of energy directors for blocking the weld deposits made of the plurality of energy directors from flowing out of the mating surfaces, so that the weld deposits may be prevented from sticking out of the mating surfaces, even if the plurality of energy directors are extended in the direction along the side wall of the upper and lower cases. In addition, the intrusion of the welding dust may also be prevented by the wall described above. Further, providing the wall described above on the inner surface of the side wall of the upper and lower cases alternately across the mating surfaces may greatly increase the strength of the mating surfaces.

DESCRIPTION OF THE PREFERRED EMBODIMENTS

Hereinafter, the present invention will be described in detail by way of preferred embodiments illustrated in the accompanying drawings.

Figure 1:
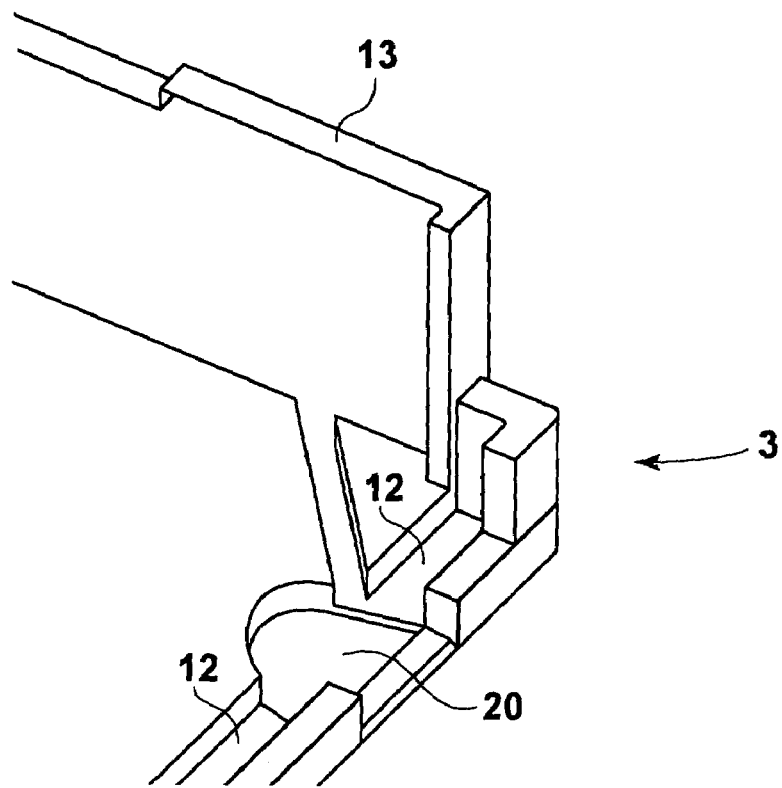
FIG. 1 is an enlarged perspective view of a magnetic tape cartridge according to the present invention, illustrating the structure of the relevant part of the lower case near the tape reeling-out opening.
Figure 4:
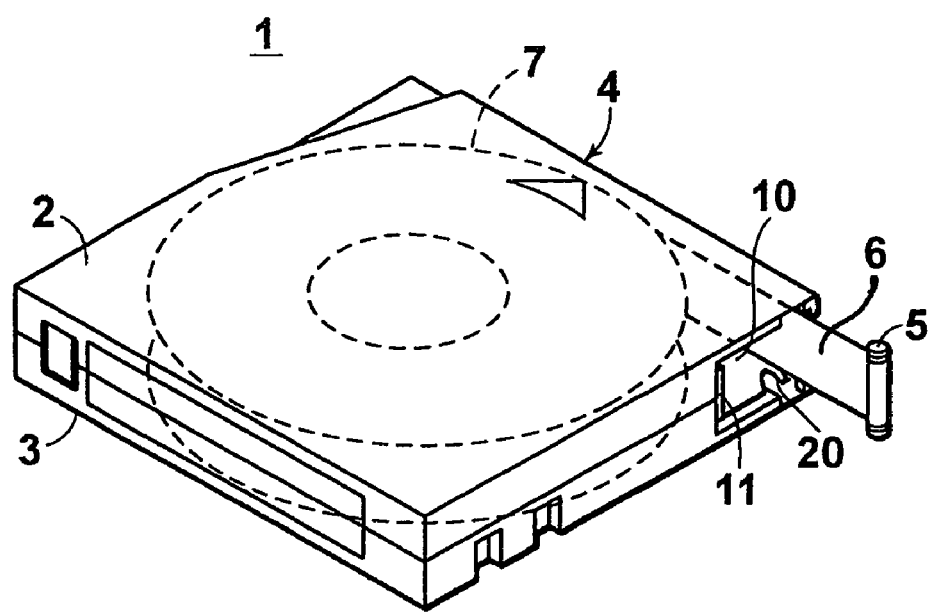
FIG. 4 is a perspective view of a conventional magnetic tape cartridge.

FIG. 1 is an enlarged perspective view of a magnetic tape cartridge according to the present invention that has substantially the same structure as that of the magnetic tape cartridge 1 shown in FIG. 4, illustrating the structure of the relevant part of the lower case near the tape reeling-out opening. FIG. 1 shows a groove 12 for a sliding door 11 to slide along to open and close an opening 10, a mating surface 13 on top of the side wall to be welded to an upper case by ultrasonic welding, and a lead-in recess for a leader pin 5.

Figure 2:
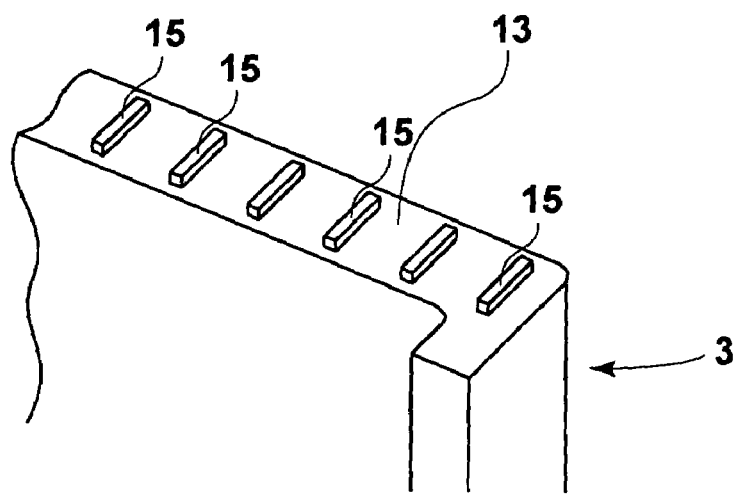
FIG. 2 is an enlarged perspective view schematically illustrating a first embodiment of the present invention.

FIG. 2 is an enlarged perspective view of a first embodiment of the present invention, illustrating that a plurality of elongated rib-like energy directors 15 are disposed on the mating surface 13 on top of the side wall of a lower case 3 with the longitudinal direction substantially perpendicular to the direction along the side wall of the mating surface 13.

Figure 3A:
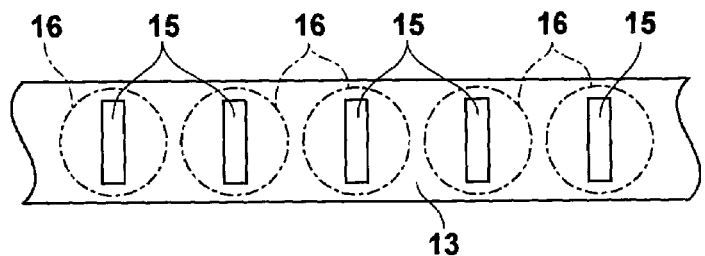
FIG. 3A is a plan view schematically illustrating a first embodiment of the present invention.

FIG. 3A is a plan view of a first embodiment shown in FIG. 2, schematically illustrating that a plurality of energy directors 15 are disposed on the mating surface 13 with weld deposits 16 to be formed by ultrasonic welding.

If the energy director 15 has an elongated rib-like shape, the weld deposit 16 formed by the energy director 15 has a tendency to extend in the direction perpendicular to the longitudinal direction thereof, as illustrated in FIG. 3A. Therefore, placement of the plurality of elongated rib-like energy directors 15 on the mating surface 13 in the direction substantially perpendicular to the direction along the side wall of the mating surfaces 13 of the upper and lower cases 2 and 3, as in this embodiment, will cause the weld deposits 16 to flow on the mating surface 13 in the direction along the side wall, so that the weld deposits 16 may be prevented from sticking out of the mating surfaces 13.

Figure 3B:
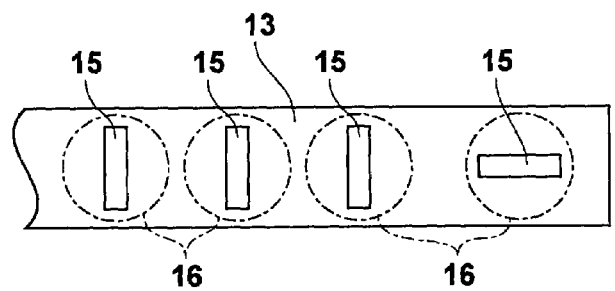
FIG. 3B is a plan view schematically illustrating a modified arrangement of a first embodiment of the present invention.

FIG. 3B shows a similar arrangement to that shown in FIG. 3A, except that one of the energy directors 15 provided on the mating surface 13 near the end of the side wall is extended to the area in close proximity to the end of the side wall in the direction parallel to the direction along the side wall. This arrangement of the energy directors allows the upper and lower cases to be welded together to the area in close proximity to the end of the side wall, while the weld deposit is prevented from sticking out of the mating surfaces at the end of the side wall.

Figure 3C:
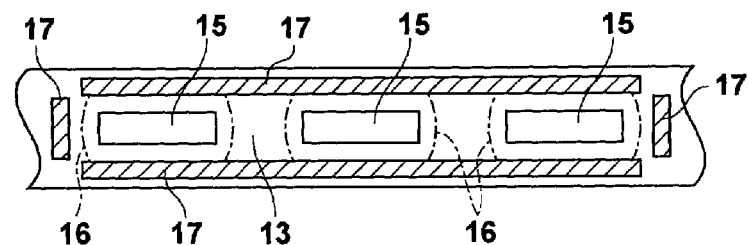
FIG. 3C is a plan view schematically illustrating a second embodiment of the present invention.

FIG. 3C is a schematic plan view of the mating surface 13 according to a second embodiment of the present invention, illustrating an arrangement in which the mating surface 13 has grooves 17 (indicated by hatched lines) for trapping the weld deposits 16 made of the energy directors 15. When the energy directors 15 are extended along the direction parallel to the direction along the side wall, as shown in FIG. 3C, the grooves 17 may be provided only on both sides of the energy directors in the direction parallel to the direction along the side wall, but it is more preferable that the grooves 17 are created such that they enclose the energy directors 15.

The magnetic tape cartridge according to the second embodiment of the present invention may prevent the weld deposits from sticking out of the mating surfaces, regardless of the direction in which the energy directors are extended.

Figure 3D:
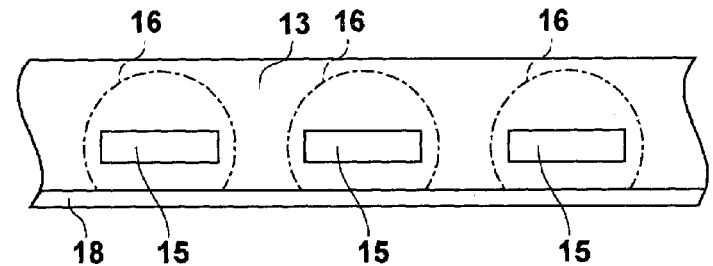
FIG. 3D is a plan view schematically illustrating a third embodiment of the present invention.

FIG. 3D is a schematic plan view of the mating surface 13 according to a third embodiment of the present invention, illustrating an arrangement in which the plurality of energy directors 15 are disposed off-center of the mating surface 13 on the inner side of the case with respect to the center of the mating surface in the direction of the thickness thereof, i.e., on a downward side of the center in FIG. 3D, and a wall 18 is provided on the inner side of the case with respect to the plurality of energy directors for blocking the weld deposits 16 formed thereby from flowing out of the mating surfaces.

The magnetic tape cartridge according to the third embodiment may prevent the weld deposits 16 from sticking out of the mating surfaces 13, even if the plurality of energy directors is disposed in the direction along the side wall of the upper and lower cases, and the welding dust generated during the welding process may be prevented from entering into the case by the wall 18 described above.

What is claimed is:

1. A magnetic tape cartridge comprising:

a cartridge case composed of upper and lower cases welded together on the mating surfaces thereof by ultrasonic welding with a plurality of energy directors, and having a tape reeling-out opening on a side wall thereof; and a single reel of magnetic tape rotatably retained therein, wherein each of said plurality of energy directors provided on one of said mating surfaces has an elongated shape, and is disposed with the longitudinal direction thereof substantially perpendicular to the direction along side walls of the upper and lower cases.

2. A magnetic tape cartridge according to claim 1, wherein said tape reeling-out opening is formed across the upper and lower cases.

3. A magnetic tape cartridge according to claim 1, wherein one of said plurality of energy directors provided on said one of the mating surfaces near the end of the side wall of the upper and lower cases is extended, to the area in close proximity to the end of said side walls, in the direction parallel to the direction along said side walls.

* * * * *